US006891595B2

(12) United States Patent
Oka et al.

(10) Patent No.: US 6,891,595 B2
(45) Date of Patent: May 10, 2005

(54) METHOD AND SYSTEM OF ORDERING VISUAL PRINTS FROM DIGITAL IMAGE DATA

(75) Inventors: Kiyoshi Oka, Huntington Beach, CA (US); Francisco Rodriguez, Irvine, CA (US); Yoshi Ishikawa, Irvine, CA (US)

(73) Assignee: Canon USA, Inc., Lake Success, NY (US)

( * ) Notice: Subject to any disclaimer, the term of this patent is extended or adjusted under 35 U.S.C. 154(b) by 113 days.

(21) Appl. No.: 10/183,654

(22) Filed: Jun. 28, 2002

(65) Prior Publication Data

US 2004/0001189 A1 Jan. 1, 2004

(51) Int. Cl.[7] .............................................. G03B 27/52
(52) U.S. Cl. ......................................... 355/40; 355/41
(58) Field of Search ............................. 355/27, 40–41; 358/487, 506

(56) References Cited

U.S. PATENT DOCUMENTS

| | | | |
|---|---|---|---|
| 5,340,966 A | 8/1994 | Morimoto | 235/376 |
| 5,359,387 A | 10/1994 | Hicks | 355/40 |
| 5,696,576 A | 12/1997 | Itoh et al. | 355/40 |
| 5,815,244 A | 9/1998 | Takuda | 355/41 |
| 5,825,467 A | 10/1998 | Narita | 355/40 |
| 5,907,391 A | 5/1999 | Kobayashi et al. | 355/40 |
| 5,940,168 A | 8/1999 | Ishii | 355/40 |
| 6,154,295 A * | 11/2000 | Fredlund et al. | 358/487 |
| 6,157,459 A | 12/2000 | Shiota et al. | 358/1.15 |
| 6,169,596 B1 | 1/2001 | Shiota | 355/40 |
| 6,278,528 B1 | 8/2001 | Ohtsuka et al. | 358/1.15 |
| 2001/0009454 A1 * | 7/2001 | Manico et al. | 355/41 |
| 2002/0052753 A1 * | 5/2002 | Shinkai | 705/1 |
| 2002/0089653 A1 * | 7/2002 | Iida | 355/40 |

* cited by examiner

*Primary Examiner*—Henry Hung Nguyen
(74) *Attorney, Agent, or Firm*—Fitzpatrick, Cella, Harper & Scinto

(57) ABSTRACT

A system and method for ordering visual prints from digital image data. The system and method include acquiring digital images from a digital image storage medium, assigning a unique identification code to the acquired digital images, storing the acquired digital images in association with the unique identification code, printing at least one index sheet of the digital image, the at least one index sheet containing visual print ordering information and the unique identification code, providing visual print information, producing visual prints based on the print order information, and providing the visual prints to a customer.

12 Claims, 18 Drawing Sheets

FIG. 6

Digital Print Order Form — May 17, 2002

6-1

Qty: 1, 2, 3, 4, 5
Qty: 6, 7, 8, 9, 10

6-2

Name
Address
Telephone

Print Order: ☐ One Set ☐ Two Sets ☐ Reprint
CD Order: ☐

Order Number:
abc20020517130224b 6-3

6-4

1/3 (Total 67 Pictures) — — — — — — — Tear off here

Print Order Receipt | Order Number: abc2002051713022 4b 6-5

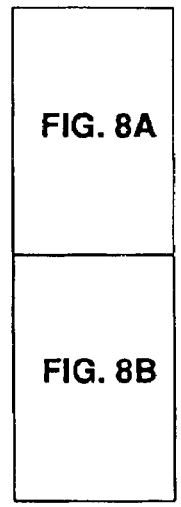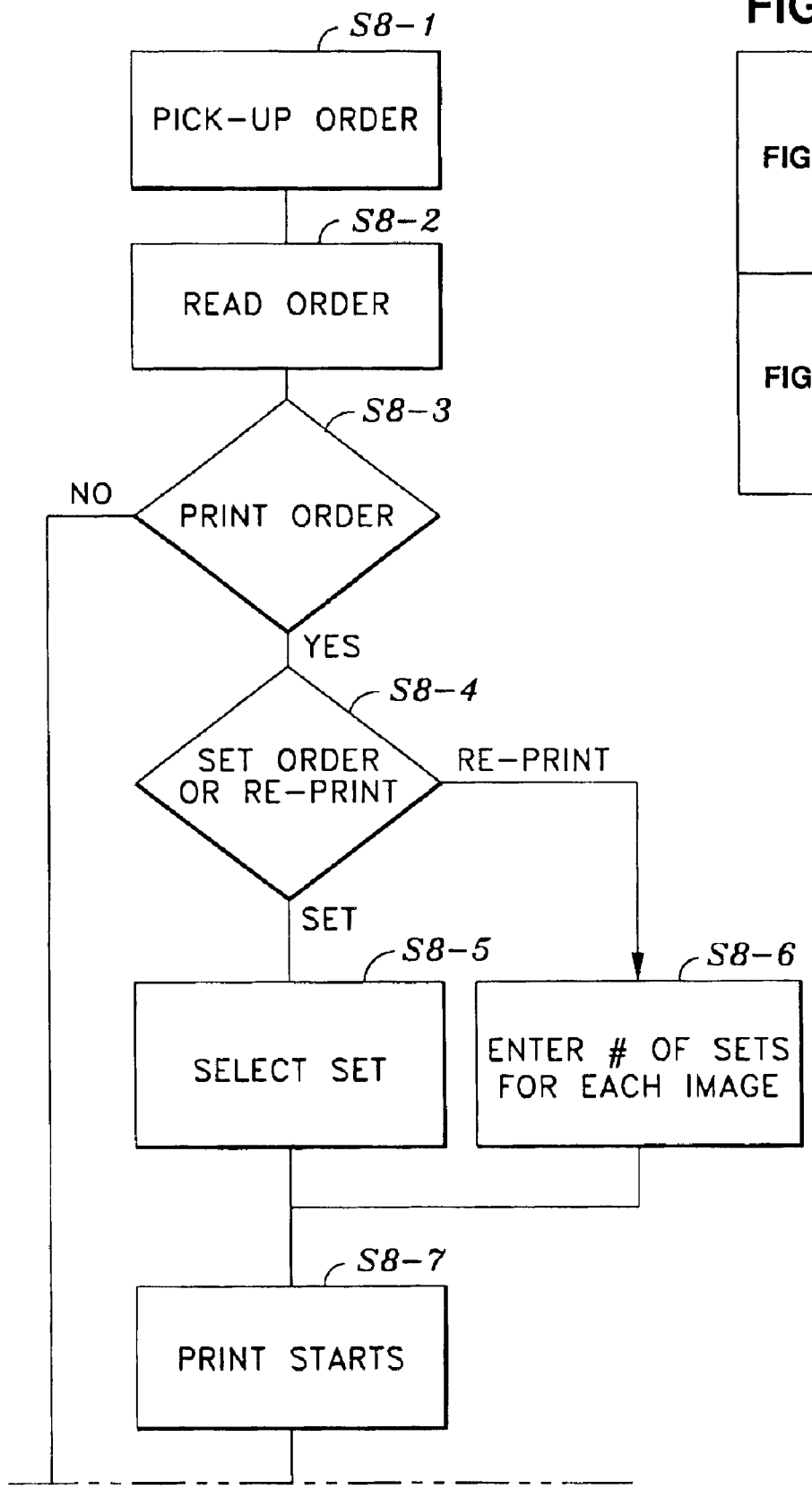

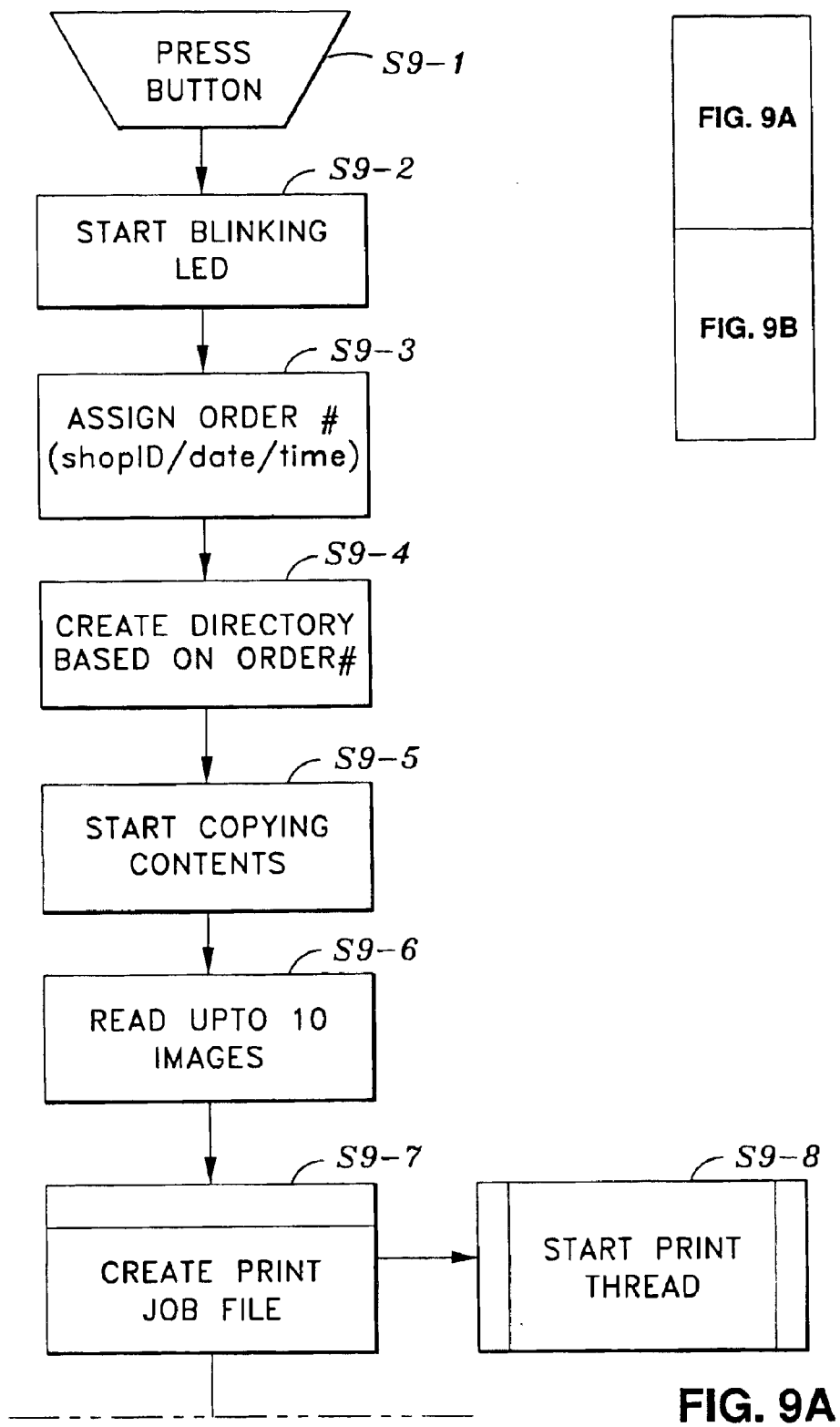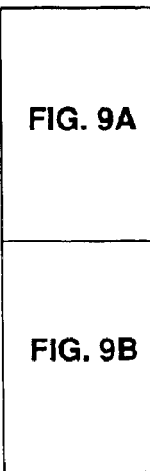

11-1 — #PHASE=0
11-2 — #COUNT=10
11-3 — #TOTAL=31
11-4 — #PURPOSE=LargeIndex
11-5 — #ORDER=xxx00320020516130224yyy
11-6 — #FILENAME=TRUE
11-7 — #DESCRIPTION=LargeIndex
SOURCE=
A010.JPG
A011.JPG
A012.JPG ——— 11-8
A013.JPG
A014.JPG
A015.JPG
A016.JPG
A017.JPG
A018.JPG
A019.JPG

FIG. 11

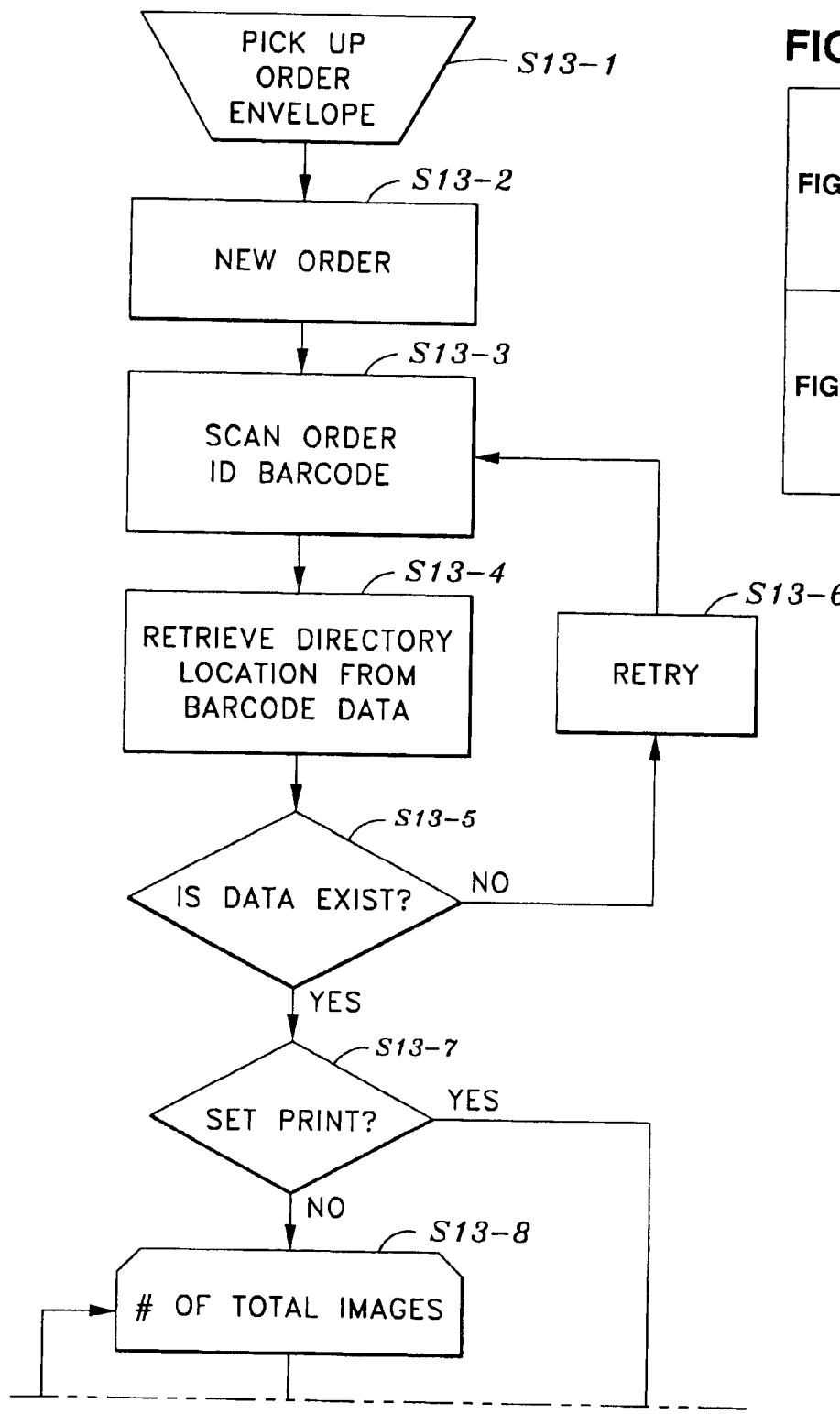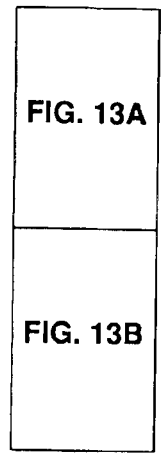

METHOD AND SYSTEM OF ORDERING VISUAL PRINTS FROM DIGITAL IMAGE DATA

BACKGROUND OF THE INVENTION

1. Field of the Invention

The invention relates to a method and system for ordering visual prints. More particularly, the invention relates to ordering visual prints from digital image data.

2. Description of the Related Art

The popularity of digital photography is constantly increasing. As the use of digital cameras has increased, so has the demand for printing the digital images captured by these cameras. The demand for digital printing has led many manufacturers to produce and many retail establishments with photo finishing labs or a stand-alone photo finishing shops to install systems for printing digital images. These systems allow the user to bring in their digital storage media and have the system photofinisher operator process and develop visual prints from the digital images.

Despite the fact that digital image printing provides a considerable business opportunity to these retail establishments and photo finishing shops, there as not been much success in promoting the idea to their customers. The main reason is that the effort required by the customer and the system photofinisher operator under the current systems is significantly different from the analog film development process they are used to.

In analog film development, a customer takes a roll of film either to a retailer's photo finishing lab or a photo finishing shop, fills out print order information on an order envelope, places the roll of film in the envelope, and then either hands the envelope to the photo finishing photofinisher operator or drops it in an order box. The photofinisher operator takes the roll of film to the developer (in some instances, the photofinisher operator and the developer are the same individual) and the developer creates a negative from the film. The negative is then used to create a set of final prints per the order information on the order envelope.

On the other hand, in current digital image processing systems, the customer usually has the option of using either a self-service kiosk or handing the digital storage media to a photofinisher operator. The self-service kiosks tend to be very complex, user unfriendly, and time consuming. In addition, in the instances where these kiosks are situated in the same location as a retailer's photo finishing lab or in a photo finishing shop, the photofinisher operator tends to end up helping the customer, thus defeating the purpose of a self-service kiosk.

With respect to the customer handing the customer's digital storage media to the photofinisher operator, the price of digital storage media makes many customers uneasy doing this. In addition, the procedure for developing visual prints from digital images on a digital storage media is different than the procedure for developing prints from analog film. This difference requires the photofinisher operator to learn new skills, and the fact that the photofinisher must switch back and forth between different processing procedures can impact productivity.

There have been some recent attempts to make obtaining visual prints from digital images easier on both the customer and photofinisher operator. The most popular method has been to provide a small system on a countertop consisting of a digital media reader (i.e., compact flash card reader), a display, a printer for printing index sheets, and an input device (i.e., touch panel). A customer inserts a digital storage media into the digital media reader and follows the instructions listed on the display. The system typically displays thumbnail sized images for the customer to view, provides printing options (i.e., print size, number of prints, etc.), requests personal information (i.e., name, address, etc.), and provides the customer with a receipt. The process of this system includes copying the images from the digital storage media to the lab or shop's server. The photofinisher operator periodically queries the server for newly stored images. When new images are located, the operator accesses the images, along with their ordering information, and sends the images and printing information to a printer.

In this approach, the burden is on the customer to correctly follow the instructions provided. And, in many instances, the customer requires the photofinisher operator's assistance to correctly submit the print order. In addition, as described above, the system requires special components such as the input device and display. This requirement for special equipment results in a high cost for the system, as well as additional complexity for both the customer and photofinisher operator to work with. Finally in instances where multiple systems would be required, the requirement for special equipment would cause a space problem. The systems presently in use are not suitable for high volume environments due to cost, complexity, and space issues.

SUMMARY OF THE INVENTION

The invention addresses the foregoing disadvantages of the current systems for creating visual prints from digital images.

According to one aspect of the invention, the invention concerns a system and method for ordering visual prints from digital images stored on a digital image storage medium. The system and method include acquiring digital images from a digital image storage medium, assigning a unique identification code to the acquired digital images, storing the acquired digital images in association with the unique identification code, printing at least one index sheet of the digital images, the at least one index sheet contains visual print ordering information and the unique identification code, providing visual print information, producing visual prints based on the print order information, and providing the visual prints to a customer.

According to another aspect of the invention, the invention concerns a system and method for ordering visual prints from digital images stored on a digital image storage medium using an access device connectable to at least one central processing device with the central processing device connectable to a printing device. The access device includes an interface to the digital image storage medium and one or more buttons, while the central processing device includes a memory for storing executable process steps. The executable process steps are configured so that in response to the central processing device's detecting button depression, the central processing device acquires digital images from the digital image storage medium, assigns a unique identification code to the acquired digital images, stores the acquired digital images in association with the unique identification code, and prints at least one index sheet of the acquired digital images, wherein the index sheet contains visual print ordering information.

According to yet another aspect of the invention, the invention concerns a system and method for ordering visual prints from digital images stored on a digital image storage medium using an access device connectable to at least one central processing device with the central processing device connectable to a printing device. The access device includes an interface to the digital image storage medium and or more buttons, while the central processing device includes a memory for storing executable process steps. The executable process steps are configured so that in response to the central processing device's detecting button depression, the central processing device acquires digital images from the digital image storage medium, assigns a unique identification code to the acquired digital images, stores the acquired digital images, and creates visual print order information for the acquired digital images.

By virtue of the foregoing, a customer seeking to order visual prints from digital images on a digital image storage medium is provided a robust solution for placing such an order in less complicated fashion than current systems. In addition, since fewer components are required by the present invention versus current systems, retailer's photo finishing labs and photo finishing shops can overcome the cost, complexity, and space issues associated with those systems. Finally, the current invention's simplification of the steps for the customer to follow in ordering visual prints from digital images allows photofinisher operators to process digital images without significantly affecting their overall productivity.

This brief summary has been provided so that the nature of the invention may be understood quickly. A more complete understanding of the invention can be obtained by reference to the following detailed description of the preferred embodiment in connection with the attached drawings.

BRIEF DESCRIPTION OF THE DRAWINGS

FIG. 6 is a drawing illustrating the first page of an index sheet printed by the present invention.

FIG. 7 is a drawing illustrating the page(s) printed after the first page of an index sheet by the present invention.

FIG. 11 depicts a preferred embodiment of the header information of the print job file of the present invention.

DETAILED DESCRIPTION OF THE PREFERRED EMBODIMENTS

Figure 1:
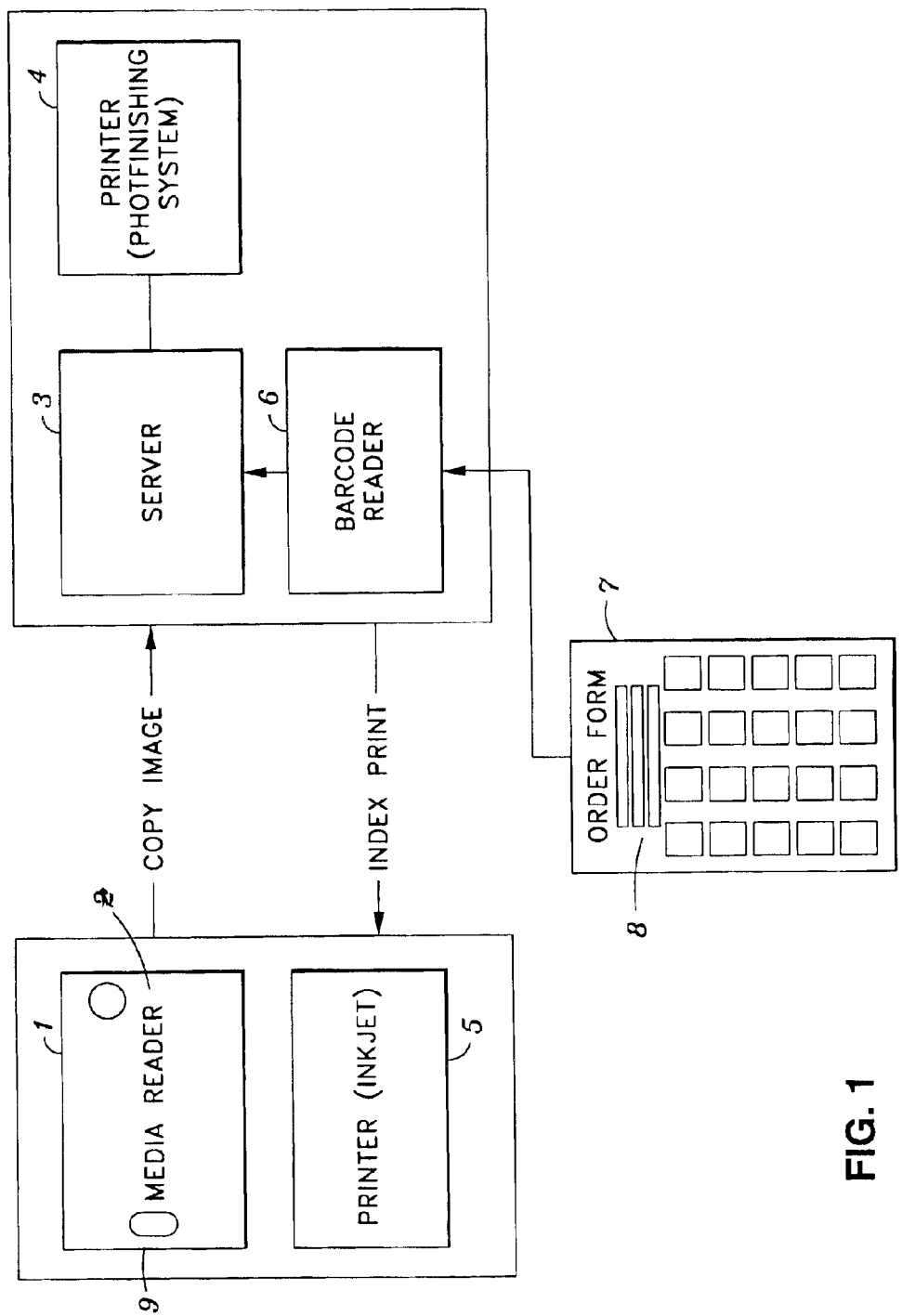
FIG. 1 is a block diagram depicting one implementation of the visual print order system of the present invention.

FIG. 1 is a block diagram depicting one implementation of the visual print order system of the present invention. As shown in FIG. 1, the system of the present invention consists of a digital media reader 1 with at least one button 2 and a light emitting diode (LED) 9 located on the top section of the media reader 1. The digital media reader 1 is connected to a computing device, remote server 3 through a cable or other form of communication, and the remote server 3 in turn is connected to a printing device 4 (photofinishing system) through a cable or other form of communication. Remote server 4 contains applications that are executed in the implementation of the present invention. The operation of remote server 3 will be described in more detail below. The computing device of the present invention is not limited to a remote server. For example, any computing device that is compatible with the bus architecture being used and contains the necessary applications may be used. The system also includes a second printing device 5 (i.e., inkjet printer) that is connected to the remote server 3 through a cable or other form of communication. Printing devices 4, 5 are not limited to any particular type of printer. A barcode reader 6 is also connected to the remote server 3 through a cable or other form of communication. Finally index sheet 7, is output by the second printing device 5, and contains a barcode 8, which is read by barcode reader 6.

Figure 2:
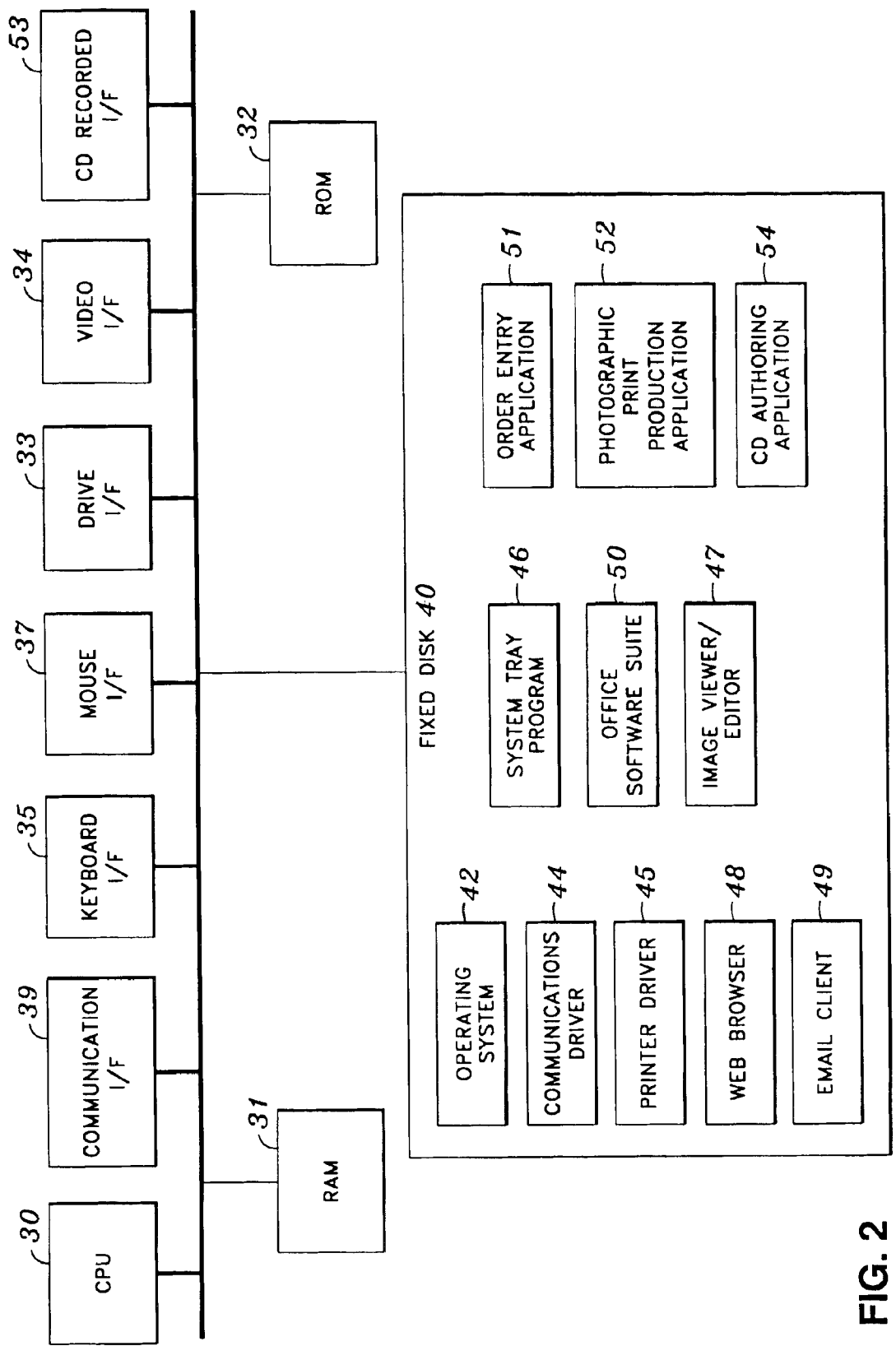
FIG. 2 is a block diagram depicting the internal architecture of a remote server used in implementing the present invention

FIG. 2 depicts the internal architecture of remote server 3. As seen in FIG. 1A, remote server 3 includes CPU 30, RAM 31, ROM 32, fixed disk 40, and bus 41. CPU 30 is a microprocessor for executing program instruction sequences. RAM 31 provides memory space for CPU 30 to fetch and execute program instructions stored on a fixed disk 40, or on other types of storage media such as compact disc (CD-ROM) or floppy disk. ROM 32 stores individual invariant instruction sequences, such as startup instruction sequences for CPU 30 or BIOS sequences for the operation of peripheral devices attached to remote server 3 (not shown). Communication between the components of remote server 3 is performed via bus 41.

As can be seen in FIG. 2, remote server 3 also includes multiple interfaces for connecting and communicating with various devices. Driver interface 33 connects drives, such as floppy disk drive (not shown) and CD-ROM drive (not shown), to bus 41 of remote server 3. Video interface 34 connects a display device (not shown), such as a monitor or flat-panel display, to remote server 3 to display data or user interface displays. Keyboard interface 35 and mouse interface 37 provide connections for a keyboard (not shown) and a mouse (not shown), thereby allowing a user to input data select items displayed on monitor using the keyboard or mouse. CD Recorder interface 53 connects a CD recorder (not shown) for writing record images to CD-ROMs.

USB interface 39 allows remote server 3 to connect to digital media reader 1, printing device 4, printing device 5, and barcode reader 6. While this embodiment is described as using USB architecture to provide interconnection between devices, it is to be understood that other types of bus architecture may be employed in practicing this invention. For example, in place of USB, IEEE 1394 bus architecture can be used to provide interconnection between the devices.

Fixed disk 40 is one example of a computer-readable medium for storing program instructions to be executed by CPU 30. Fixed disk contains operating system 42, network interface driver 44, printer driver 45, system tray program 46, image viewer/editor 47, web browser 48, email client 49, office software suite 50, order entry application 51, visual print production application 52, and CD authoring application 54. Operating system (OS) 42 can be a windowing operating system, such as Windows 2000, or a Unix based operating system. Operating system 42 manages the application running on remote server 3 as wall as the various components that make up remote server 3. Network interface driver 44 facilitates communication between applications running on remote server 3 and devices connected via network interface 39. Printer driver 45 facilitates preparing and sending print jobs to printing device 4 or printing device 5. CD recorder driver 54 facilitates writing record images to CD-ROMs via CD recorder interface 53.

Application programs 47 to 51 are provided for preselection for launch and execution upon the occurrence of a designated event. Designated triggering events include depression of button 2 of digital media reader 1. In this embodiment, image viewer/editor 47 is an application for viewing and editing digital images. Web browser 48 is an application, such as Microsoft's Internet Explorer or Netscape's Navigator, which allows a user to view material such as web pages over the Internet. Email client 49 is an application for sending and receiving email over the Internet or a local network. Office Suite 50 is a group of applications, including word processors, spreadsheets, and presentation applications. Order entry application 51 accesses data stored at one location, image data on storage media connected to digital media reader 1 for example, and transfers or copies that data to a different location, a specified directory on remote server 3 for example. CD authoring application 54 provides a series of user interface windows through which the photofinisher operator selects the digital images to be included in a CD job for a customer order and adjusts the selected images. For example, the photofinisher operator may adjust a selected image by rotating it. The selected and adjusted digital images are then processed into a CD record image and written to a CD-ROM by CD authoring application 54.

System tray program 46 monitors for a signal from digital media reader 1 that button 2 has been depressed. When button 2 has been depressed, system try program 46 launches and executes one or more pre-selected applications. Possible applications include launching and executing order entry application 51 to transfer image data stored on a digital image storage medium to remote server 3 and to print index sheet 7.

Figure 3:
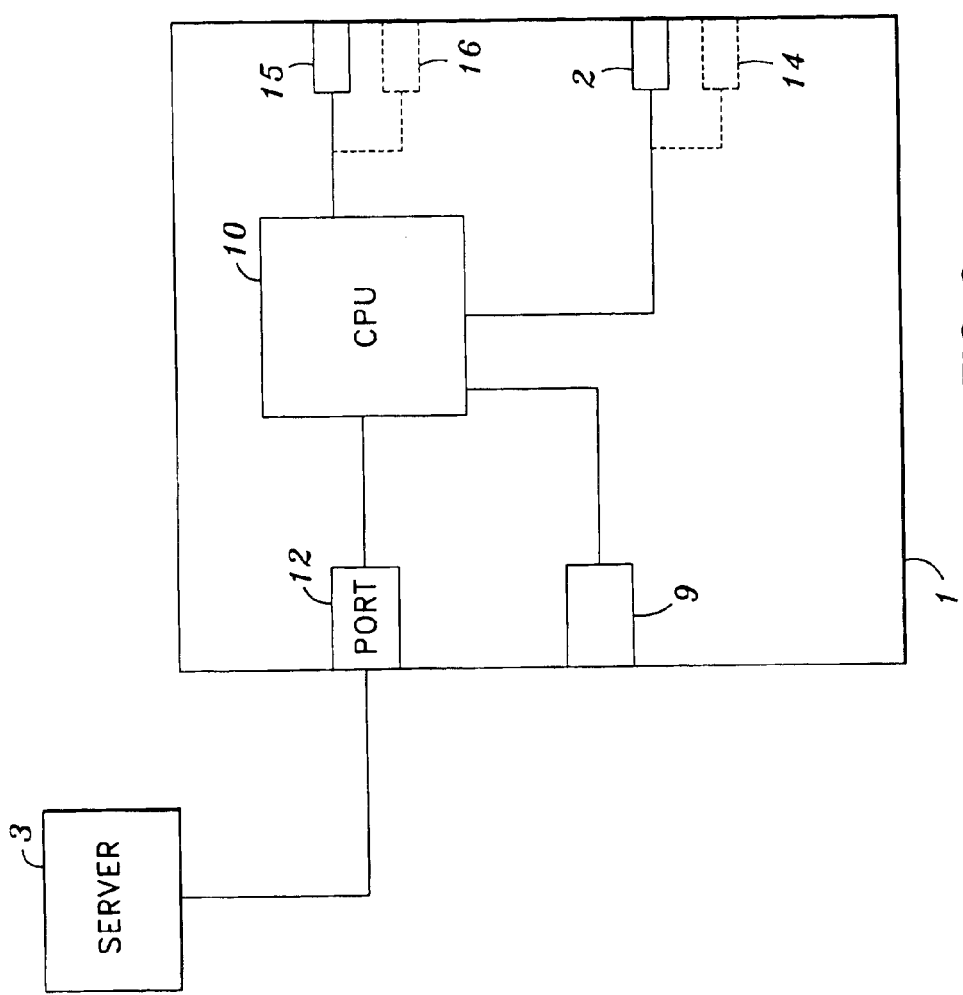
FIG. 3 is a block diagram depicting one implementation of the structure of a digital media reader used in implementing the present invention.

FIG. 3 is a block diagram depicting one implementation of the structure of a digital media reader used in implementing the present invention. As can be seen in FIG. 3, digital media reader 1 contains a central processing unit (CPU) and several devices and a port connected to that CPU. CPU 10 is a microprocessor for executing program instruction sequences. Port 12 is an interface used by digital media reader 1 to communicate with remote server 3. As discussed above, the present embodiment is described as using USB, thus port 12 is an upstream USB port that accepts connections to upstream USB compatible devices such as computing devices. It is to be understood that port 12 can use any type of communication protocol, such Ethernet, or IEEE 1394 to provide the interconnection between digital media reader 1 and remoter server 3.

In addition to port 12, digital media reader 1 also includes multiple devices connected to CPU 10. The multiple devices within digital media reader 1 include media reader 15, button 2, and LED 9.

Media reader 15 provides an interface for connecting removable digital storage media to access data stored on the media. When removable digital storage media are connected to media reader 15, the data stored on the media is accessible to a device connected to CPU 10. For example, an application running on remote server 3 could upload image data stored on the media connected to media reader 15.

In this embodiment, media reader 15 is a card reader that provides a connection and access to compact flash storage media. However, the invention is not limited to media reader 15 being a card reader. The connected device may be a reader for other types of removable digital storage media besides compact flash storage media. For example, media reader 15 could provide access to data stored on Smart Media, Sony's Memory Stick, IBM Microdrive, etc. For purposes of this description, media reader 15 will be considered as being compatible with compact flash storage media.

In another embodiment, digital media reader 1 includes at least one other media reader 16 in addition to media reader 15. This would allow media reader 1 to provide an interface for connecting different types of removable digital storage media.

Also connected to CPU 10 within digital media reader 1 is button 2. CPU 10 monitors whether a user has depressed button 2 or not. When a user has depressed button 2, CPU 10 notifies remote server 3 that button 2 has been depressed. Remote server 3 executes an associated action in response to the notification by CPU 10. A more detailed description of the initiation of the associated action within remote server 3 is provided below. In another embodiment, digital media reader includes at least one additional button 14 to button 2. The at least one additional button 14 would provide functionality different from the functionality provided by button 2.

Also connected to CPU 10 within digital media reader 1 is LED 9. LED 9 is used to provide in-use status to the user. For example, before beginning to upload image data stored on media connected to media reader 15, remote server 3 commands CPU 10 to begin flashing LED 9 so that the user does not remove the media while it is being accessed. Once the images have been uploaded, remote server 3 commands CPU 10 to discontinue flashing LED 9 to indicate to the customer that the media can be removed.

Figure 4:
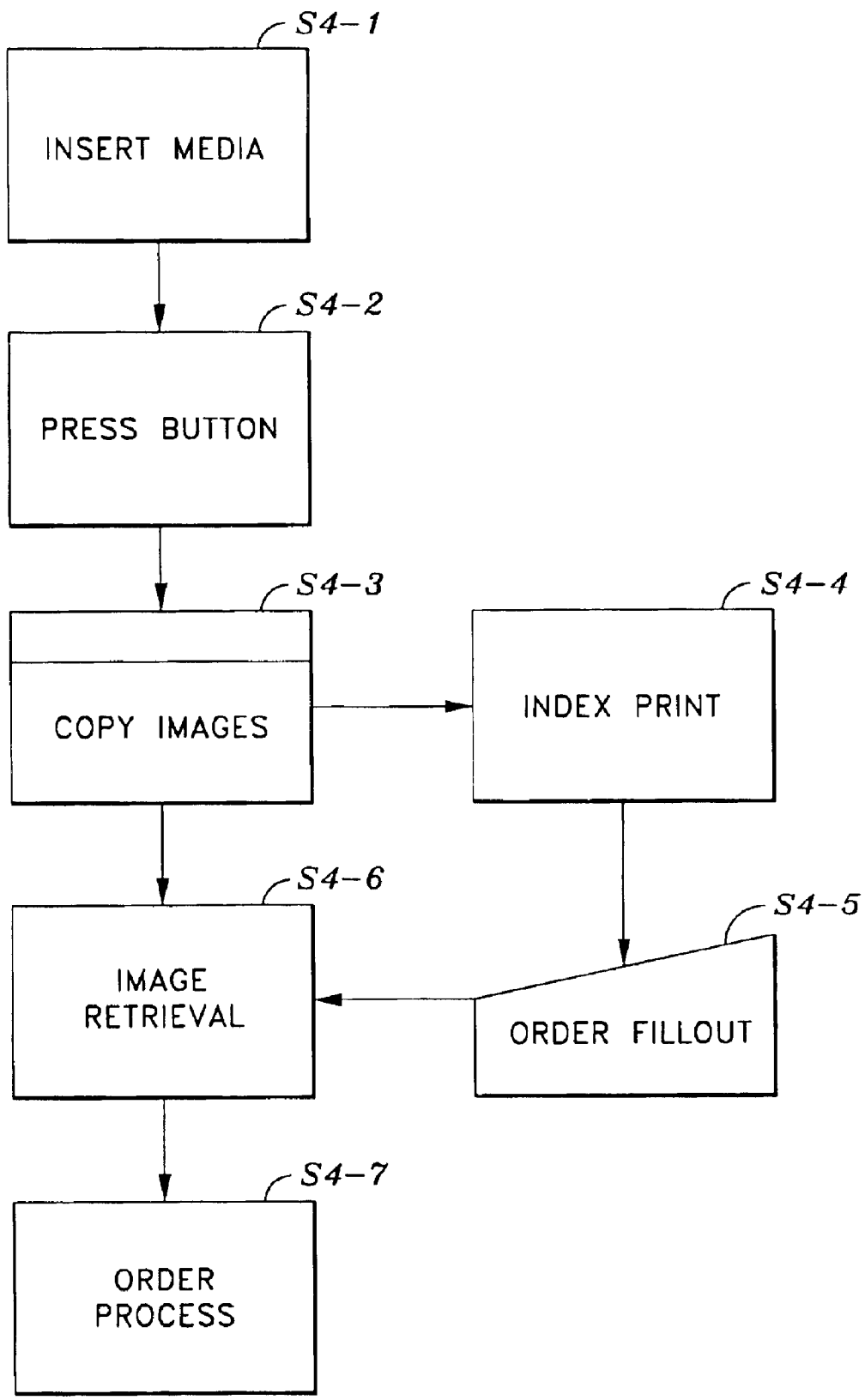
FIG. 4 is a flowchart for describing the visual print order system of the present invention.

FIG. 4 is a flowchart for describing the visual print order system of the present invention. Briefly, a customer inserts a digital image storage medium into a digital media reader 1 and then presses a button 2 located on the digital media reader 1. Remote server 3 detects the depression of the button 2, commands the digital media reader 1 to begin flashing its LED 9, and commences acquiring all of the digital images located on the digital image storage medium, and stores the images into a target storage directory. Remote server 3 prints an index sheet 7 containing the digital images and print order information. After the customer fills out the print ordering information, the index sheet 7 is returned to a photofinisher operator. The photofinisher operator proceeds to retrieve the selected images from the remote server 3 and processes the images according to the print ordering information. The images are printed and made available to the customer for pick-up.

In more detail, in step S4-1, a customer inserts a digital image storage medium into digital media reader 1. As described above, in the preferred embodiment, the digital media reader 1 is a card reader that provides a connection and access to a compact flash storage media. And, as described above, any type of media reader (Smart media, Sony Memory stick, etc.) would be applicable.

In step S4-2, after inserting the digital image storage medium into the digital media reader 1, the customer proceeds to press a button 2 located on the digital media reader 1. Depression of button 2 by the customer results in digital media reader 1 providing a signal to remote server 3 that button 2 has been depressed. Upon receipt of the signal, remote server 3 commands digital media reader 1 to begin flashing its LED 9. This provides the customer with an indication that an action is taking place.

In addition, detecting that button 2 has been depressed, remote server 3 in step S4-3 begins acquiring all of the digital images located on the digital image storage medium. Remote server 3 stores the images in a target storage directory as described below.

While acquiring and storing the images in step S4-3, the server 3, in parallel, begins to process the images and send them as an index sheet 7 to inkjet printer 5 in step S4-4. To keep the print time of the index sheet 7 to a minimum, the index sheet is created using partial data of the acquired images as described below.

Index sheet 7 comprises thumbnail size images of the acquired images, along with order entry information and a barcode 8 and is described in further detail below with respect to FIG. 6. The order entry information is similar to the order entry information found on order envelopes used in the analog film development process.

When the index sheet 7 has been printed, the customer proceeds to fill out the print order information in step S4-5. This information includes selection of the images to be printed, print quality, print quantity, etc.

In steps S4-6, the barcode reader 6 is used to read barcode 8. Barcode 8, as described below in reference to FIG. 6 contains the information used by server 3 to retrieve the stored digital images.

Once the digital images have been retrieved, in step S4-7, the selected images are processed according to the print order information. Once processed, the images are sent to printer 4 to be printed. The printed materials and print order information are then matched to ensure delivery of the correct images to the customer.

Figure 5:
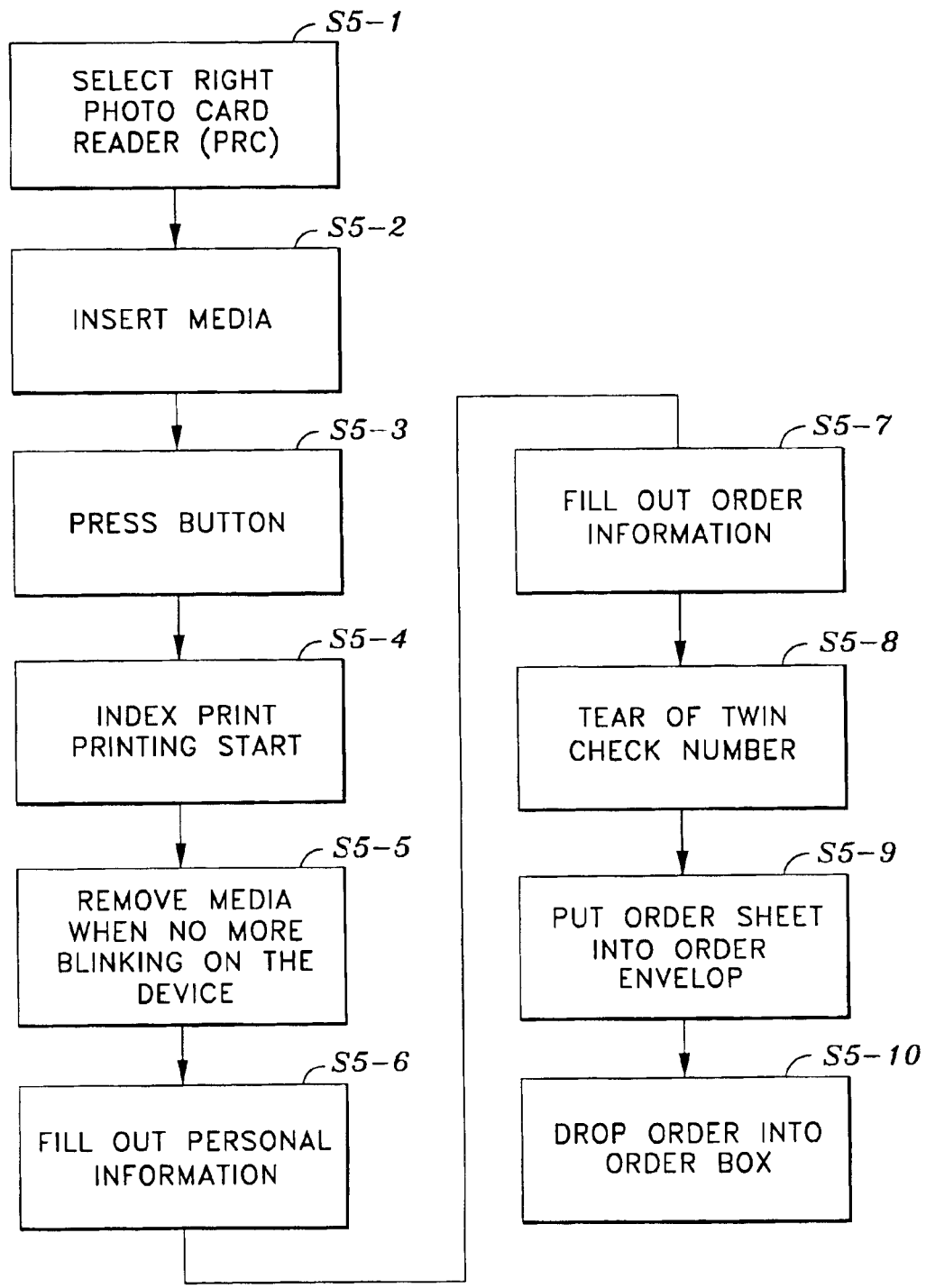
FIG. 5 is a flowchart for describing the steps for ordering visual prints according to the present invention.

FIG. 5 is a flowchart for describing the steps for ordering visual prints according to the present invention. Briefly, when a customer wishes to place an order for printing from a digital image storage medium, the customer removes the digital image storage medium from a digital image-capturing device (i.e., digital camera). The customer inserts the digital image storage medium into its respective digital media reader 1. After inserting the digital image storage medium into the digital media reader 1, the customer depresses a button 2 located on the digital media reader. After a slight delay following depression of the button 2, the index sheet 7 begins to print. As soon as all the pages of the index sheet 7 have printed, the customer proceeds to fill out the print order information located on the index sheet 7. When the print order information has been completed, the customer removes a receipt from the index sheet 7 and drops the index sheet 7 into an order box. Once the order has been processed, the customer returns to pick-up the order using the receipt.

In more detail, steps S5-1 through S5-4 are similar in nature to steps S4-1 through S4-4 described above, and thus the referenced description is applicable to the present steps.

FIG. 6 is a drawing illustrating the first page of an index sheet 7 printed in step S5-4. Order date 6-1 represents the date the order was placed. Up to 10 thumbnail images 6-2 are printed on the first page of the index sheet. The order form section 6-3 of the index sheet is contains customer personal information, such as name, address, and telephone number. In addition, order form section 6-3 is where the customer indicates print order information such as number of sets of prints or whether re-prints are desired. The customer can also indicate whether images should be copied to a compact disc. Order number 6-4 is a set of alphanumeric characters used to uniquely identify each order, and appears on the page in the form of a barcode. The order number 6-4 is used to match the order with the customer, as well as the order and the location on the server 3 of the digital images associated with the order. The number of the current page, total pages, and total number of pictures 6-5 appears towards the bottom of the page. Receipt information 6-6 containing order number 6-4 is printed at the bottom of the page. The receipt portion of the index sheet is perforated, allowing the customer to tear off the receipt for later use in picking up the order.

Figure 7:
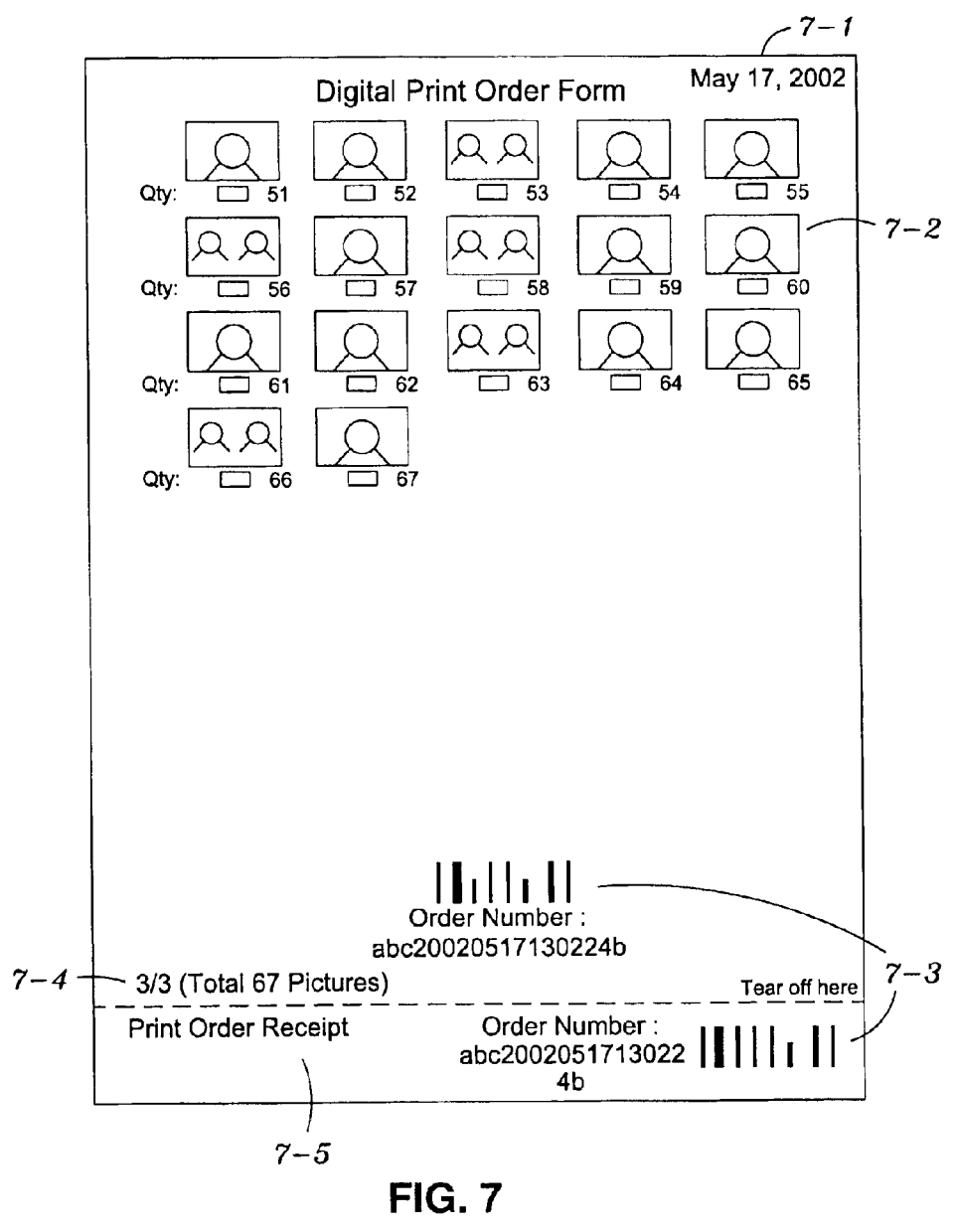

The drawing of FIG. 7 is a drawing illustrating the page(s) printed after the first page of the index sheet 7 printed in step S5-4 if more than 10 images are included in the order. As in the case of the first page, order date 7-1 represents the date of the order. Print order information is only printed on the first page of the index sheet, thus, up to 40 thumbnail images can be printed on any of the pages printed after the first page. Order number 7-3 and the current page, total pages, and total number of pictures 7-4 appear on all subsequent pages as well. In addition, receipt information 7-5 is also printed on all subsequent pages. In another embodiment, the number of images is limited to one image per page of the index sheet.

Returning to FIG. 5, after all the images have been printed, the customer removes the digital storage media from the digital media reader in step S5-5.

In step S5-6, the customer fills out the print order information in the order section 6-3 of the first page of the index sheet 7. When the customer has completes print order information, in step S5-7, the customer removes receipt information 6-6 from one of the pages and in step S5-8 places all of the pages of the index sheet 7 into an order envelope. The order envelope is similar to the envelope currently used in the analog film ordering process. In step S5-9, the customer drops the envelope into an order box, which is similar to the order box used in analog film ordering process. Once the order has been processed, the customer returns in step S5-10 to pick-up the order using receipt information 6-6.

Figure 8B:
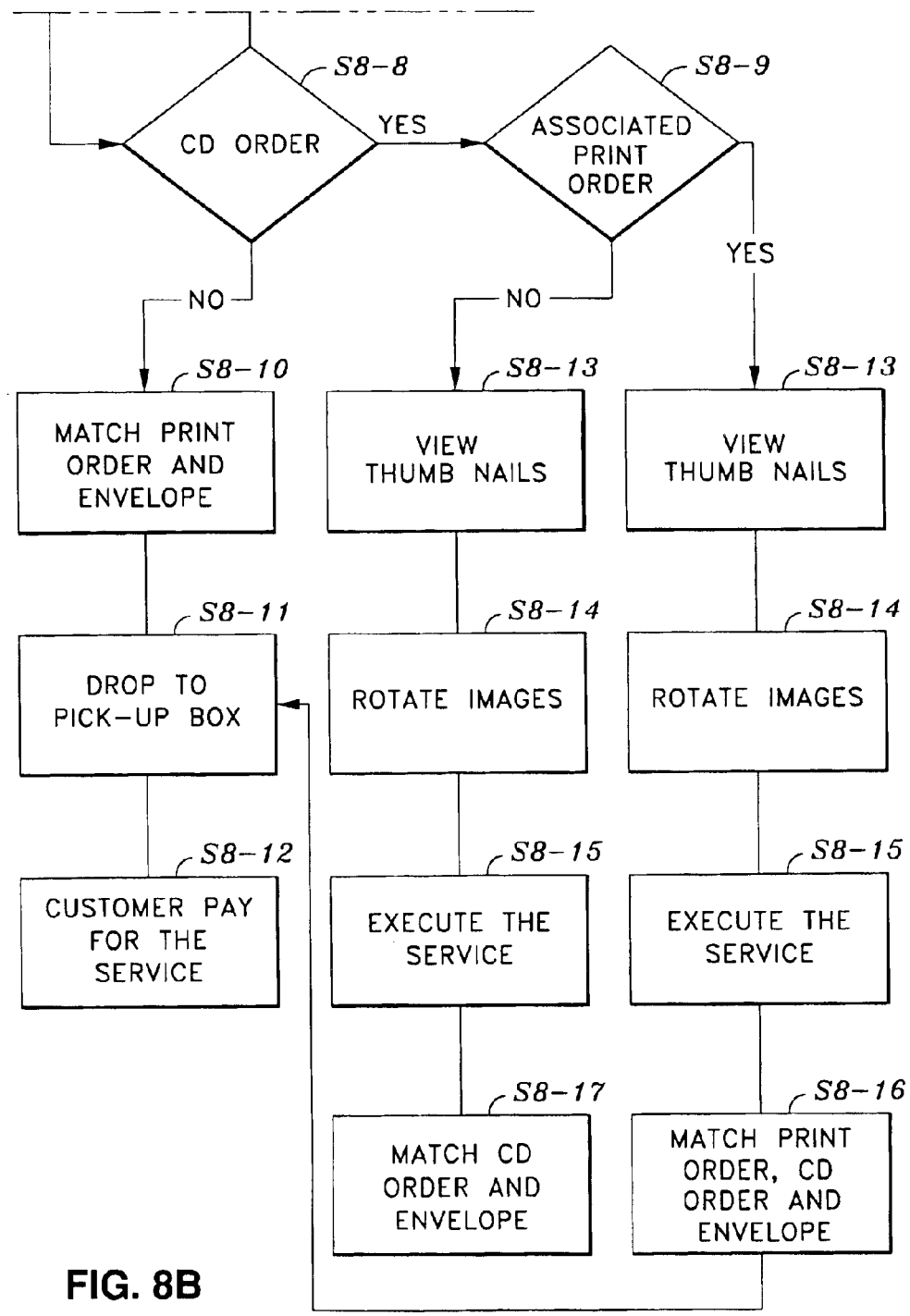
FIG. 8 is a flowchart for describing the steps for producing visual prints from digital images according to the present invention.

FIG. 8 is a flowchart describing the steps for producing visual prints from digital images according to the present invention. Briefly, after the customer drops off the order, the photofinisher operator retrieves the order envelope from the order box. The photofinisher operator scans the barcode representing the order number 6-4, and then reads the order information. Based on the order information, images are retrieved from the server 3 and sent to either a printer 4, saved to a compact disc, or both. When processing of the order is completed, the photofinisher operator places the visual prints, compact disc, or both into the order envelope dropped off by the customer and places the envelope into a pick-up box to be picked up by the customer.

In more detail, in step S8-1, the photofinisher operator picks up the order envelope left by the customer in the drop box as described above. The photofinisher operator, in step S8-2, reviews the index sheet 7 and scans the barcode to obtain the order number 8-4. As described above, this number is used to reference the target storage directory for the digital images associated with the order.

In step S8-3, the photofinisher operator determines if the customer is ordering prints. If in step S8-3 the photofinisher operator determines the customer is ordering prints, flow moves to step S8-4, where the photofinisher operator determines if the print order is for a set of prints or if it is for re-prints. If the order is for a set of prints, in step S8-5 the photofinisher operator enters the number of requested prints. If the order is for re-prints, the number of re-prints for each photo is entered in step S8-6.

After either the number of requested prints of the number of re-prints is selected, or if the photofinisher operator determines the order is not for prints, flow proceeds to step S8-7. In step S8-7, the images selected on the index sheet 7 are read from the target storage directory on the server 3 and printing of the images is initiated.

In step S8-8, the photofinisher operator determines if the customer is requesting the selected images be copied to a compact disc. If a request has been made, a determination is made in step S8-9 whether an associated order for prints has been made. If an associated print order does not exist, the photofinisher operator launches CD authoring application 54 described above in step S10-9. In step S8-13, the photofinisher operator views thumbnail sized images of the images selected on the index sheet 7, rotates the images as needed in step S8-14, and the selected images are written to a CD-ROM in step S8-15. The photofinisher operator matches the compact disc order with the order envelope in step S8-17. The compact disc is matched with the envelope by using the compact disc's burning station's indicator.

If in step S8-9 a determination is made that an associated print order does exist, the photofinisher operator launches CD authoring application 54 described above, and follows steps S8-13 through S8-15 described above. In step S8-16, in addition to matching the compact disc order with the order envelope, the photofinisher operator also matches the print order with the order envelope. Matching of the print order with the order envelope is accomplished using an index sheet printed along with the visual prints.

After matching the print order and compact disc order with the order envelope in step S8-16, or just the compact disc order with the order envelope in step S8-17, compact disc itself or the visual prints and compact disc are placed in the order envelope and deposited in the pick-up box in step S8-11. The customer than picks up the envelope and provides payment in step S8-12.

Returning to step S8-8, if the photofinisher operator concludes that the customer is not requesting the selected image by copied to a compact disc, the photofinisher operator matches the print order with the order envelope in step S8-10. The matching in this step is the same as described above in reference to step S8-16. Flow then proceeds to steps S8-11 and S8-12 as described above.

Returning to step S8-3, if the photofinisher operator determines the customer is not ordering prints, flow proceeds to step S8-8 where, as described above, the photofinisher determines if the customer wishes to have the selected images copied to a compact disc.

Figure 9B:
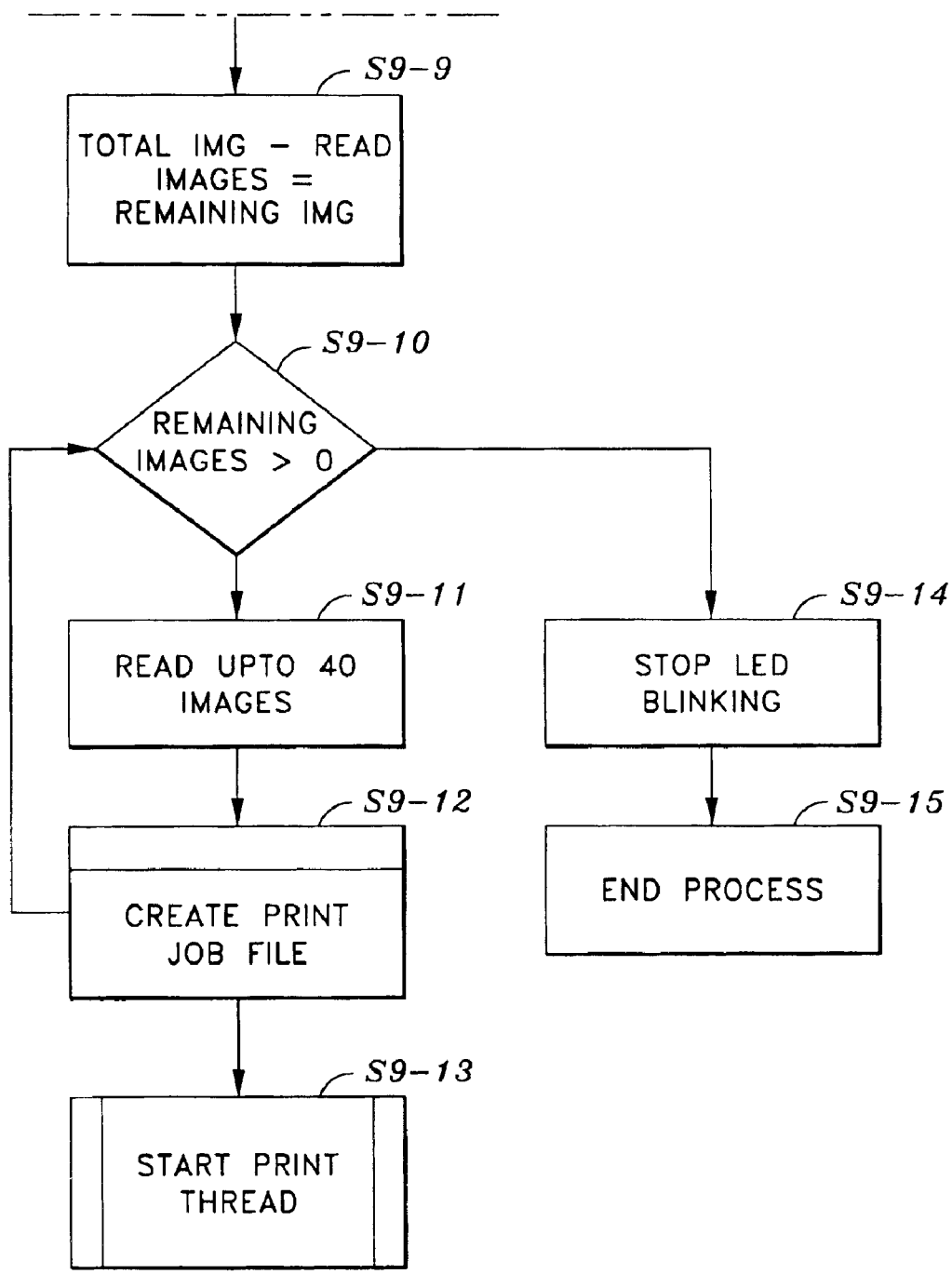
FIG. 9 is a flowchart for describing the order entry application the present invention.

FIG. 9 is a flowchart for describing the order entry application 51 of the present invention. As described above, this application acquires digital images from a digital image storage medium, stores the images on remote server 3, and prints out index sheet 7 containing print order information.

Briefly, the process is initiated when a customer depresses a button on the digital media reader 1. The application commands the digital media reader 1 to begin flashing its LED 9, and then assigns an order number to the present task. A target storage directory for storing the images to be acquired is created on remote server 3. Upon creation of the target storage directory, the application begins acquiring images from the digital image storage medium. Initially, up to 10 images are acquired and then a print job file is created. The first page of the index sheet 7 is then printed. While printing the first page, acquisition of any remaining images from the digital image storage medium occurs. Once acquired, print jobs are created for these images, and the images printed. When all images have been acquired and all print jobs created, the digital media reader 1 is commanded to discontinue flashing its LED.

In more detail, the customer depresses the digital media reader's 1 button 2 in step S9-1. Order entry application 51 receives a signal from digital media reader 3 indicating button 2 has been depressed. Upon receipt of this signal, the digital media reader 3 is commanded in step S9-2 to begin flashing its LED 9. Flashing of the LED 9 is an indication to the customer that processing is occurring.

An order number 6-4 is assigned to the present task in step S9-3. It is assigned each time the present process is initiated. The order number 6-4 includes the shop or store identification number, the date the customer dropped off the order, and the time the order was dropped off. As described above, order number 6-4 is used to locate the acquired digital images on remote server 3.

Figure 12:
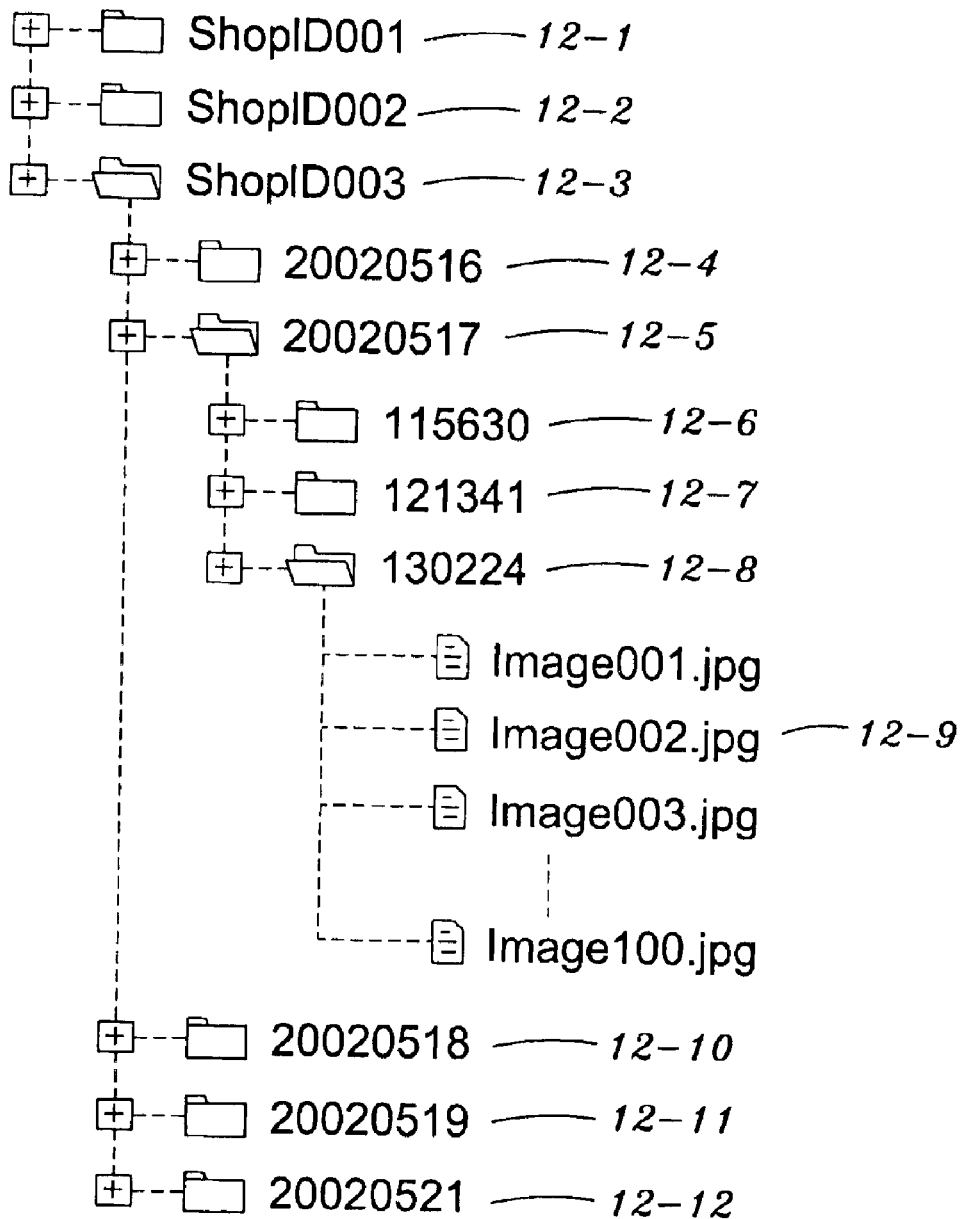
FIG. 12 is a diagram depicting a preferred embodiment of the directory structure for storing acquired digital images according to the present invention.

Once order number 6-4 has been assigned, in step S9-4, it is used to create the target storage directory on remote server 3 where the acquired images are to be stored. The preferred embodiment of the directory structure is depicted in FIG. 12. As previously described, the directory is created on remote server 3 and contains all the images acquired from the digital image storage medium. The main directory of the target storage directory is the store or shop identification number. For example, 12-1, 12-2, and 12-3 depict three different stores or shops (ShopID001, ShopID002, and ShopID003). The subdirectory to the store or shop identification number is the order date. As shown in FIG. 12, ShopID003 12-3 had five orders on five different days 12-4, 12-5, 12-10, 12-11, and 12-12. The subdirectory to the order date is the order time. Three orders were placed on May 17, 2002 12-5 at three different times 12-6, 12-7, and 12-8. The acquired digital images 12-9 are stored in the order time subdirectory. The order number 6-4 appearing on the index sheet 7 consists of leading checksum digits, store or shop identification number, order date, and order time. Using a combination of store or shop identification number, order date, and order time ensures that no two order numbers are identical.

Returning to FIG. 9, once creation of the target storage directory is completed in step S9-4, the digital images on the digital image storage medium are copied to the target storage directory in step S9-5. To reduce the time between depression of the button 2 by the customer and printing of the first page of the index sheet 7, in step S9-6, no more than the first 10 images are read and a print job file for the first page of the index sheet 7 is created in step S9-7.

Figure 10:
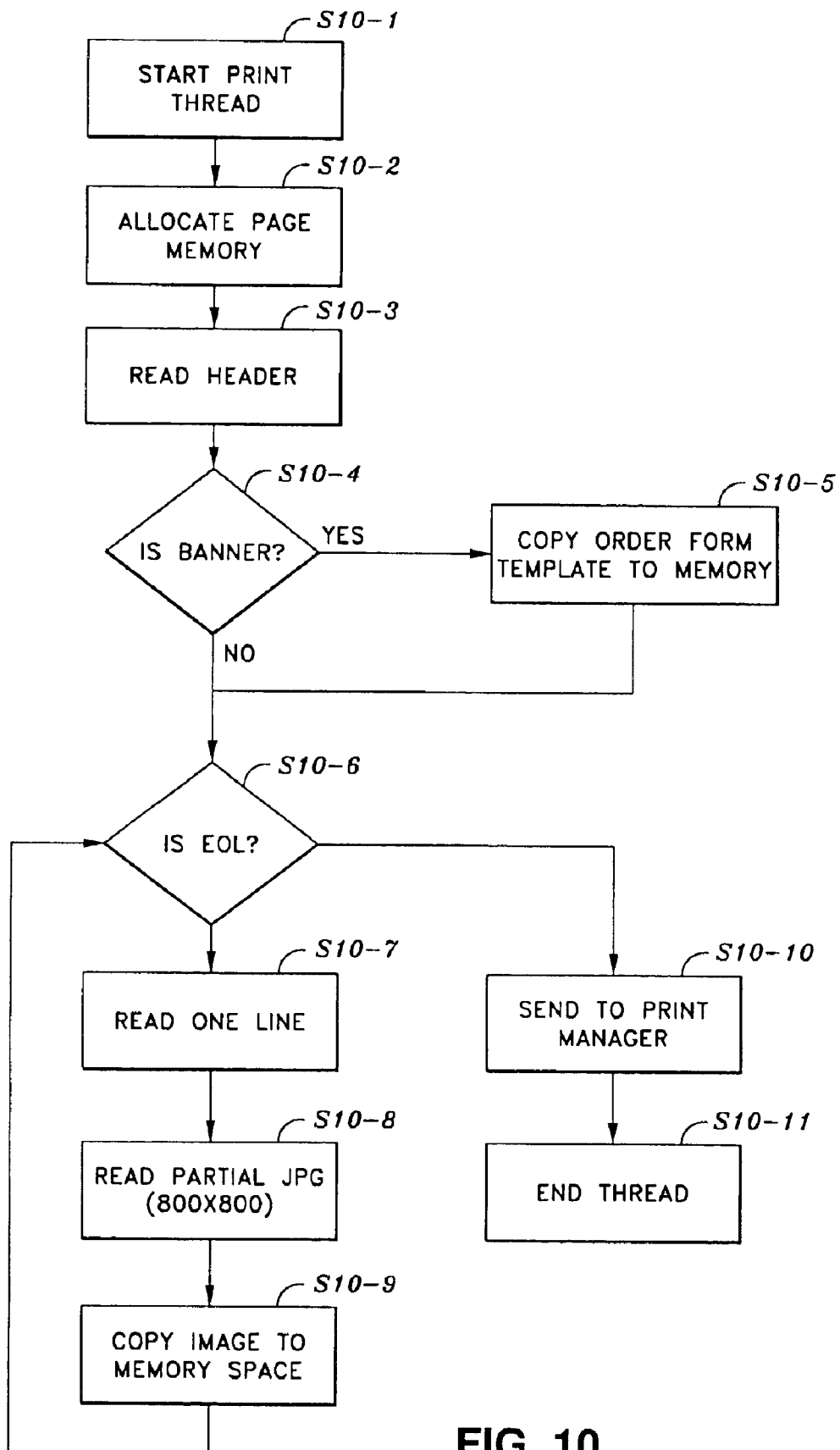
FIG. 10 is a flowchart for describing printing of an index sheet according to the present invention.

Upon creation of a print job file, the printing is initiated in step S9-8. FIG. 10 is a flowchart for describing the printing process of an index sheet 7 according to the present invention. Briefly, after the process is initiated, memory to hold data for a single printing page is allocated and then the print job file's header information is read. A check is made to determine whether the current print job is for the first page of the index sheet 7. If it is, an order form template is copied from the server's memory and merged into the final printing image of the index sheet 7. Next, the print job file is used to start reading in the digital image files to be printed on the index sheet 7. When an image is found, partial image data is read and copied into a targeted memory space on the server. Images continue to be read and copied into the targeted memory space until there are no more images to be read. Once there are no more images to be read, the data in the targeted memory space is sent to the printer for printing.

In more detail, the process is initiated in step S10-1. In step S10-2, memory is allocated to hold data for a single printing page. Normally, the printing page is "letter' size. Next, in step S10-3, the print job file's header information is read.

FIG. 11 depicts the preferred embodiment of data stored in the print job file for the first page of the index sheet 7. The header information includes #PHASE 11-1, #COUNT 11-2, #TOTAL 11-3, #PURPOSE 11-4, #ORDER 11-5, #FILE-NAME 11-6, #DESCRIPTION 11-7, and #SOURCE 11-8. "#PHASE" 11-1 indicates whether the print job is for the first page, middle page(s), or last page of the index sheet 7. "#COUNT" 11-2 is the number of images in the print job, while "#TOTAL" 11-3 is the total number of images for the particular order. "#PURPOSE" 11-4 designated the type of print job, "#ORDER" 11-5 is order number 6-4, and "#FILENAME" 11-6 is a boolean, that when set to "TRUE" will show the file name on the index sheet 7. "#DESCRIPTION" 11-7 is a field for entering any text to be printed on the index sheet 7. "#SOURCE" 11-8 is the list of file names used for a particular print job.

Returning to the flow of FIG. 10, once the print job file's header information is read in step S10-3, a check is made in step S10-4 to determine whether the print job is the first page of the index sheet 7. If it is, flow continues to step S10-5, where an order form template is copied from the server's memory and merged into the final printing image of the index sheet 7. The order template contains the information for order form 6-3 section of the index sheet 7 as described above. If the print job is not the first page of the index sheet 7, or after the order template has been merged, in step S10-6 a check is made to determine whether the process has read all the digital images for the particular print job. If the images have not all be read, then flow moves to step S10-7 where "#ORDER" 11-5 of the print job file header is used to locate and retrieve the digital image file(s). When retrieving the image, in step S10-8, the printing process will only retrieve partial data so as to increase the retrieval and printing speed since a smaller amount of data needs to be processed. In step 8-9, the partial image data are copied to a target memory space. These steps are repeated until all of the digital images have been retrieved.

Once all of the images have been read, flow moves to step S10-10, where the page is sent first from the target page memory space to a print manager, then to a printer driver, and finally to the printer. After the print job is successfully sent to the print manager, the printing process terminates in step S10-11 after deleting the print job file.

Returning to the flow of FIG. 9, after printing of the first page using the process of FIG. 10 described above has been initiated, any remaining images on the digital image storage medium are acquired in step S9-9.

In step S9-10, a determination is made whether any images remain on the digital image storage medium. If no images remain, then the digital media reader is instructed in step S9-14 to discontinue flashing its LED and the process terminates in step S9-15. If images still remain, then in step S9-11, up to 40 images are acquired from the digital image storage medium. As described above, up to 40 images can be printed on any page(s) of the index sheet 7 following the first page. Once 40 or less images have been acquired, a print job file as described with respect to step S9-7 is created in step S9-12. When the print job file created in step S9-12 is completed, the printing process as described above is initiated in step S9-13.

Figure 13B:
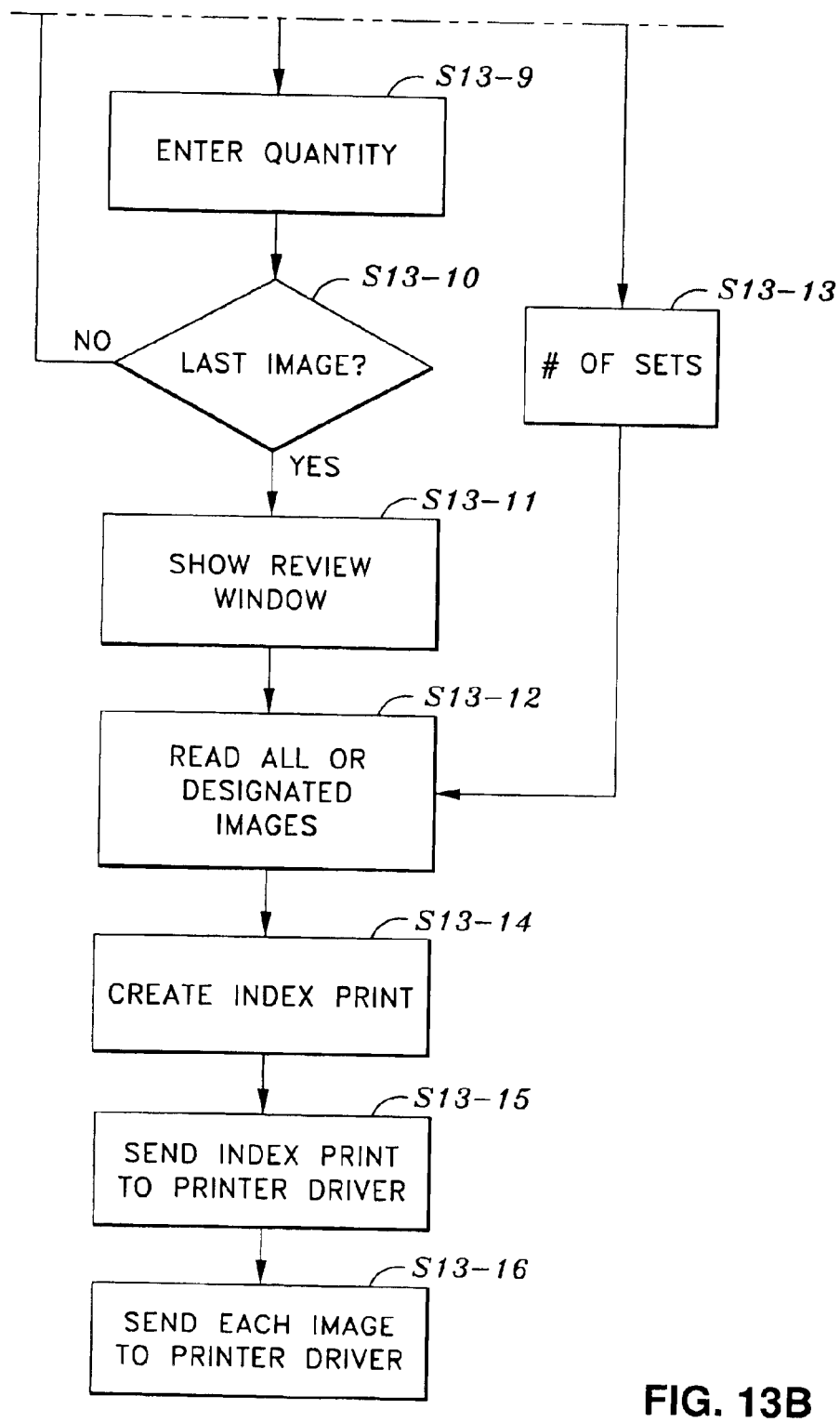
FIG. 13 is a flowchart for describing the visual print production application according to the present invention.

FIG. 13 is a flowchart for describing the visual print production application according to the present invention. Briefly, after picking up the order form dropped off by the customer, the photofinisher operator initiates the order process procedure at a terminal connected to the server 3. The photofinisher operator scans the barcode or order number 6-4 on the index sheet 7 causing the application to search the server for the directory defined in the barcode. After the directory is located, the photofinisher operator is prompted to enter the order type and associated order information. Following entry of the order type and order information, the application retrieves the selected images from the storage directory on the server, creates and index print of the images, and sends the index print to the printer. The print order is then sent to the printer.

Figure 14:
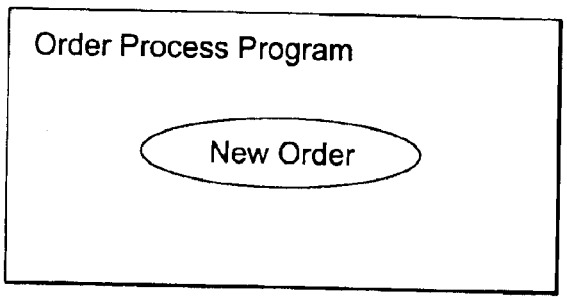
FIG. 14 is a depiction of a user interface for implementing the process flow depicted in FIG. 13.
Figure 15:
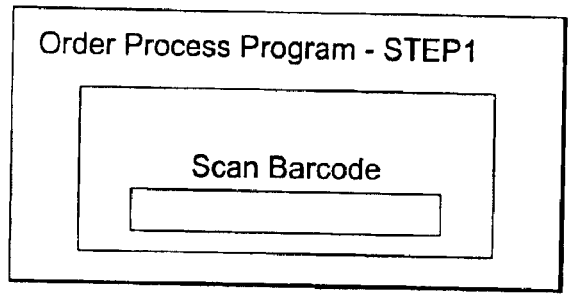
FIG. 15 is a depiction of a user interface for implementing the process flow depicted in FIG. 13.

In more detail, in step S13-11, the photofinisher operator picks up the order envelope left by the customer in the order box. After picking up the order envelope, the photofinisher operator launches visual print production application 52 at a terminal connected to remote server 3 in step S13-12. The application 52 is launched by choosing "New Order" on the terminal's user interface as depicted in FIG. 14. In step S13-13, the photofinisher operator is prompted to scan the barcode or order number 6-4 on the order form as depicted in FIG. 15, and in step S13-14, the target storage directory is determined from the contents of the barcode.

in step S13-15, the application determines whether the storage directory exists. If not, in step S13-16 a retry occurs and the photofinisher operator is prompted to scan the barcode again.

Figure 16:
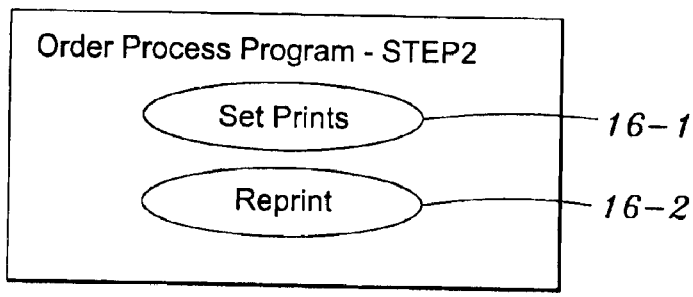
FIG. 16 is a depiction of a user interface for implementing the process flow depicted in FIG. 13.

If the storage directory exists, the photofinisher operator is prompted in step S13-17 to choose whether the current order is a print order or a re-print order. FIG. 16 depicts the order type screen used by the photofinisher operator to make the determination of step S13-17.

Figure 17:
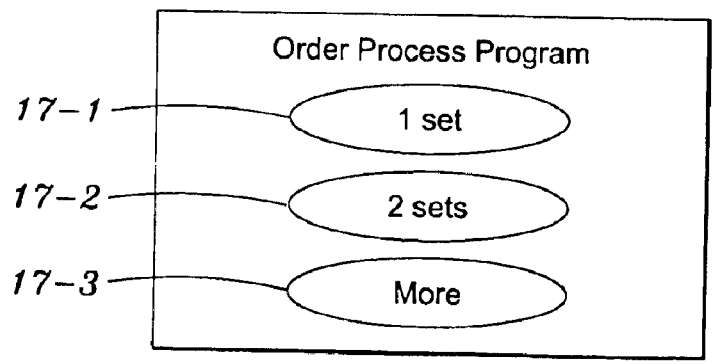
FIG. 17 is a depiction of a user interface for implementing the process flow depicted in FIG. 13.
Figure 18:
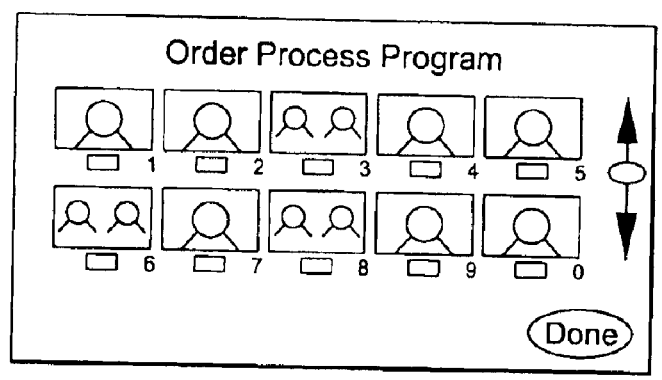
FIG. 18 is a depiction of a user interface for implementing the process flow depicted in FIG. 13.

When the photofinisher operator chooses the "Set Prints" 16-1 option, flow proceeds to step S13-113, where the photofinisher operator enters the number of sets. After the number of sets has been entered, flow proceeds to step S13-112 described below. As shown in FIG. 17, the photofinisher operator chooses from "1 set" 17-1, "2-sets" 17-2, or "More" 17-3. When the photofinisher operator chooses the "Reprint" 16-2 option, flow proceeds to steps S13-18 where the images to be printed are displayed on the terminal as depicted in FIG. 18. Using the order form provided by the customer, in step S13-19, the photofinisher operator enters the copies to be printed for each of the images. In step S13-110, a check is made to determine if the all of the images have been displayed. If all the images have not been displayed, then steps S13-18 and S13-19 are repeated. If all the images have been displayed, then a preview of the order is displayed at steps S13-111 so that the photofinisher operator can ensure the correct images have been selected and quantity for each of the selected images is correct. Flow then proceeds to step S13-112.

In step S13-112, the selected images are read from the target storage directory on remote server 3. An index print is created in step S13-114 and sent to the printing device 4 in step S13-115. The index print is provided to assist the photofinisher operator in matching the resulting visual prints with the print order and to provide the customer with an index print of the order.

Finally, in step S13-116, each of the selected images is sent to printing device 4 to complete fulfillment of the print order. Upon completion of printing the current job, the application 52 returns to a wait state until a new order is initiated.

The above embodiment of the present invention includes media reader 15 for connecting removable digital storage media to access data stored on the media. In another embodiment, a CD-ROM drive can be substituted for media reader 15, where a CD-ROM would be the removable digital storage media. In this embodiment, the buttons and associated functionality corresponding to depression of the buttons for the CD-ROM system are similar to the buttons and associated functionality described above with respect to media reader 15.

While the invention is described above with respect to what is currently its preferred embodiment, it is to be understood that the invention is not limited to that described above. To the contrary, the invention is intended to cover various modifications and equivalent arrangements within the spirit and scope of the appended claims.

What is claimed is:

1. A system for ordering visual prints from digital images stored on a digital image storage medium, comprising:

acquiring means for acquiring digital images from a digital image storage medium;

assigning means for assigning a unique identification code to the acquired digital images;

storing means for storing the acquired digital images in association with the unique identification code;

printing means for printing at least one index sheet of the digital images, wherein the at least one index sheet contains visual print ordering information, and wherein the index sheet contains the unique identification code;

input means for providing the visual print order information;

production means for producing visual prints based on the print order information;

providing means for providing the visual prints to a customer.

2. A system according to claim 1, wherein the digital images are acquired from a compact flash card, smart media card, memory stick, or compact disc.

3. A system according to claim 1, wherein the unique identification code is a customer order number.

4. A system according to claim 1, wherein the digital images are stored at a digital image center remote from the location where the digital images were acquired.

5. A system according to claim 4, wherein the digital images selected on the index sheet are retrieved from the digital image center using the unique identification code.

6. A system according to claim 1, wherein the input means allows selection from the index sheet of the desired digital images for which visual prints are to be produced.

7. A method for ordering visual prints from digital images stored on a digital image storage medium, comprising:

acquiring digital images from a digital image storage medium;

assigning a unique identification code to the acquired digital images;

storing the acquired digital images in association with the unique identification code;

printing at least one index sheet of the digital images, wherein the at least one index sheet contains visual print ordering information, and wherein the at least one index sheet contains the unique identification code;

providing visual print order information;

producing visual prints based on the print order information;

providing the visual prints to a customer.

8. A method according to claim 7, wherein the digital images are acquired from a compact flash card, smart media card, memory stick, or compact disc.

9. A method according to claim 7, wherein the unique identification code is a customer order number.

10. A method according to claim 7, wherein the digital images are stored at a digital image center remote from the location where the digital images were acquired.

11. A method according to claim 10, wherein the digital images selected on the index sheet are retrieved from the digital image center using the unique identification code.

12. A method according to claim 7, wherein the print order information is provided via selection from the index sheet of the desired digital images for which visual prints are to be produced.

* * * * *